United States Patent
Carson et al.

(10) Patent No.: US 10,677,464 B2
(45) Date of Patent: Jun. 9, 2020

(54) SELF-CENTERING BOLTED FLUID FITTING

(71) Applicant: Rohr, Inc., Chula Vista, CA (US)

(72) Inventors: Kassidy L Carson, San Diego, CA (US); Jorge E Muniz, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 616 days.

(21) Appl. No.: 14/713,888

(22) Filed: May 15, 2015

(65) Prior Publication Data
US 2016/0334105 A1    Nov. 17, 2016

(51) Int. Cl.
| | | |
|---|---|---|
| *F16L 23/02* | (2006.01) | |
| *F23R 3/28* | (2006.01) | |
| *F16L 27/053* | (2006.01) | |
| *F16L 23/032* | (2006.01) | |
| *F16L 23/028* | (2006.01) | |
| *F16L 27/08* | (2006.01) | |
| *F16L 41/08* | (2006.01) | |

(Continued)

(52) U.S. Cl.
CPC ............. *F23R 3/28* (2013.01); *F02C 7/00* (2013.01); *F02C 7/222* (2013.01); *F16L 23/003* (2013.01); *F16L 23/02* (2013.01); *F16L 23/0283* (2013.01); *F16L 23/032* (2013.01); *F16L 23/036* (2013.01); *F16L 23/12* (2013.01); *F16L 27/053* (2013.01); *F16L 27/08* (2013.01); *F16L 41/086* (2013.01); *F05D 2230/64* (2013.01); *F05D 2260/30* (2013.01)

(58) Field of Classification Search
CPC ..... F16L 23/02; F16L 23/032; F16L 23/0283; F16L 27/08; F16L 27/053; F16L 41/086
See application file for complete search history.

(56) References Cited

U.S. PATENT DOCUMENTS

| | | | |
|---|---|---|---|
| 568,996 A | 10/1896 | Totham | |
| 2,422,597 A * | 6/1947 | Stewart | ................. F16L 27/053 285/116 |

(Continued)

FOREIGN PATENT DOCUMENTS

| | | | |
|---|---|---|---|
| CA | 1042035 | 11/1978 | |
| CA | 1042035 A * | 11/1978 | ............ F16L 23/006 |

(Continued)

OTHER PUBLICATIONS

Extended European Search Report dated Nov. 10, 2016 in European Application No. 16169903.8.

(Continued)

*Primary Examiner* — David Bochna
*Assistant Examiner* — James A Linford
(74) *Attorney, Agent, or Firm* — Snell & Wilmer L.L.P.

(57) ABSTRACT

A fluid fitting assembly is disclosed according to various embodiments. The fluid fitting assembly may comprise a fluid fitting, a fluid fitting retainer, and an alignment feature. The fluid fitting may comprise a tube and a fluid fitting flange. The fluid fitting retainer may comprise a retainer flange, wherein an inner surface of fluid fitting retainer is configured to seat against a radially outer surface of the fluid fitting flange. The alignment feature may be disposed on an outer diameter of the fluid fitting, wherein the alignment feature is located adjacent to the fluid fitting flange.

20 Claims, 7 Drawing Sheets

(51) Int. Cl.
*F02C 7/00* (2006.01)
*F02C 7/22* (2006.01)
*F16L 23/00* (2006.01)
*F16L 23/036* (2006.01)
*F16L 23/12* (2006.01)

(56) References Cited

U.S. PATENT DOCUMENTS

| | | | | |
|---|---|---|---|---|
| 3,498,643 A | * | 3/1970 | Reiss | F16L 23/0286 285/189 |
| 6,050,614 A | * | 4/2000 | Kirkpatrick | F16L 23/024 123/469 |
| 2011/0220760 A1 | | 9/2011 | Gyuricsko et al. | |
| 2012/0161439 A1 | * | 6/2012 | Rajopadhye | F16L 23/0283 285/405 |

FOREIGN PATENT DOCUMENTS

| | | | |
|---|---|---|---|
| CN | 101450712 | 6/2009 | |
| CN | 101517302 | 8/2009 | |
| DE | 3820379 A1 * | 1/1989 | F16L 23/0283 |
| DE | 202008015985 | 2/2009 | |
| DE | 102009051477 | 5/2011 | |
| DE | 202015101565 | 4/2015 | |
| EP | 0793049 | 9/1997 | |
| EP | 0875710 | 11/1998 | |
| FR | 1157108 A * | 5/1958 | F16L 23/02 |
| GB | 633654 A * | 12/1949 | F16L 23/02 |
| GB | 1432384 * | 4/1976 | |
| GB | 2175661 | 12/1986 | |
| WO | 2008031497 | 3/2008 | |

OTHER PUBLICATIONS

The State Intellectual Property Office of People's Republic of China, Chinese Second Office Action dated May 15, 2019 in Application No. 201610319402.7.
Chinese Intellectual Proerty Office of People's Republic of Cina, Chinese Office Action dated Sep. 25, 2019 in Application No. 201610319402.7.
State Intellectual Property Office of People's Republic China, Chinese Search Report dated Aug. 15, 2018 in Application No. 201610319402.7.
State Intellectual Property Office, P.R. China, Chinese First Office Action dated Aug. 28, 2018 in Application No. 201610319402.7.

* cited by examiner

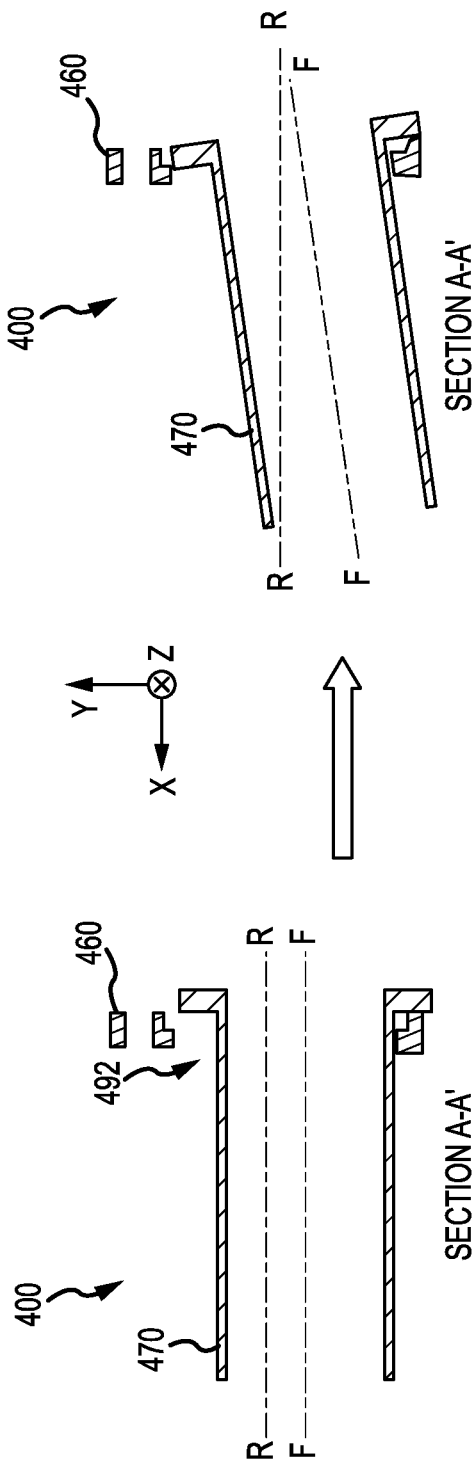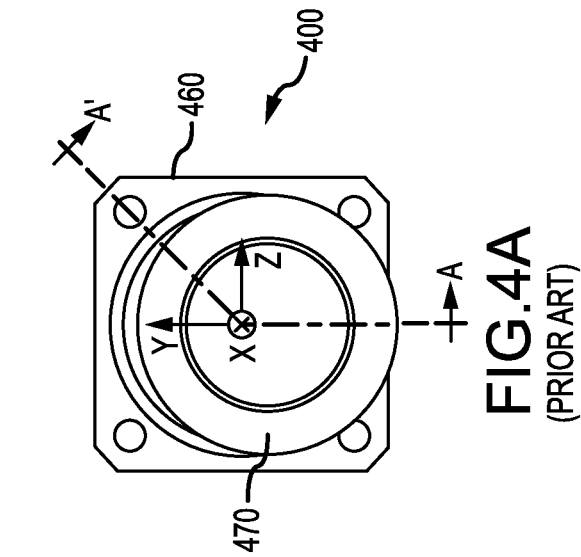
FIG. 4A (PRIOR ART)
FIG. 4B (PRIOR ART)
FIG. 4C (PRIOR ART)

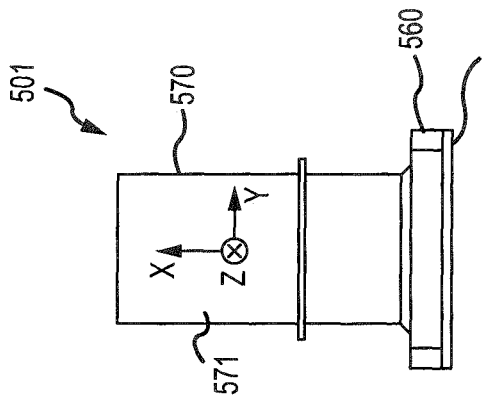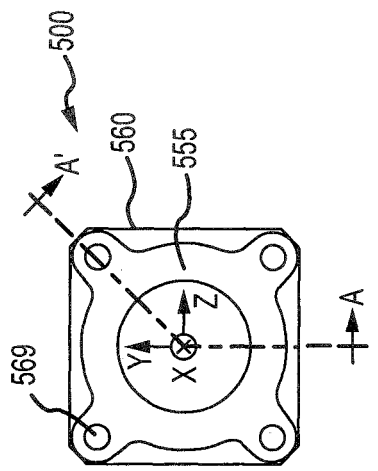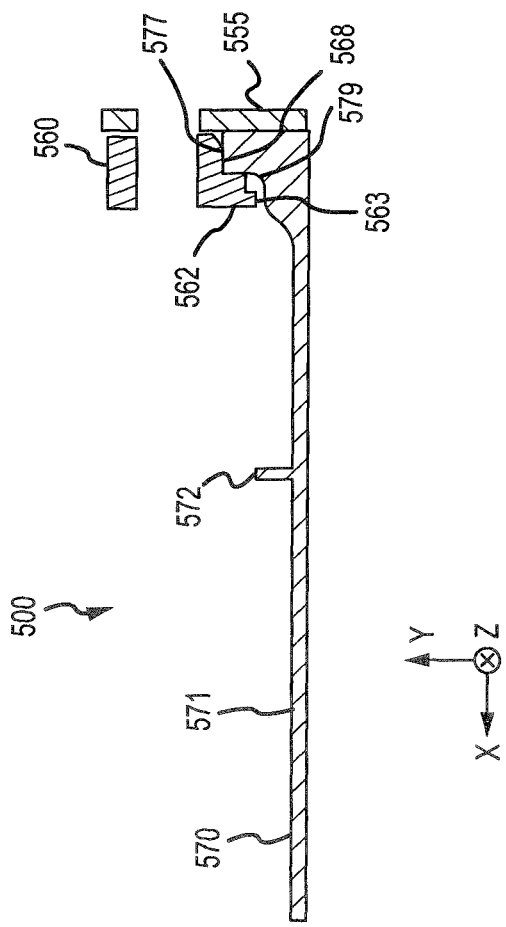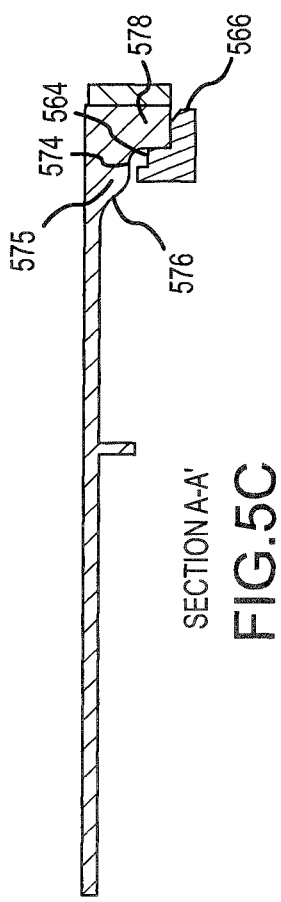

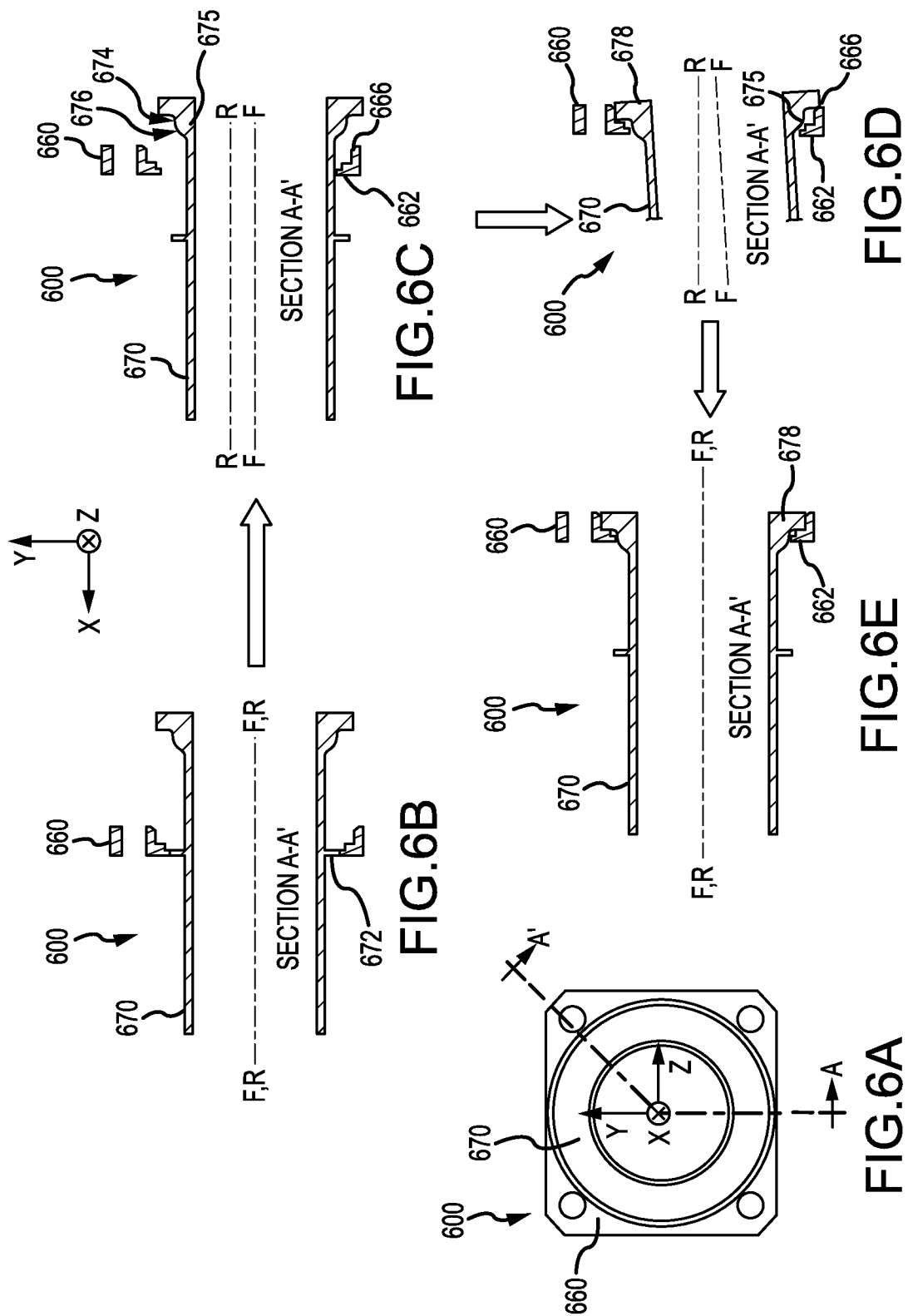

SELF-CENTERING BOLTED FLUID FITTING

FIELD

The present disclosure relates to turbine engine systems and, more specifically, to fluid fitting attachment systems for use with a turbine engine fuel system.

BACKGROUND

Turbine engine fuel lines may be coupled to various portions of a gas turbine engine. Due to manufacturing limitations, there may be a large gap between a fluid fitting and a fluid fitting retainer which may increase probability of a misalignment during installation. A misaligned fluid fitting assembly may experience permanent deformation when torqued down to an improperly aligned position. Deformations may lead to less detectable leaks, including latent leaks which may occur after thermal expansion or contraction.

SUMMARY

A fluid fitting assembly is disclosed according to various embodiments. The fluid fitting assembly may comprise a fluid fitting and a fluid fitting retainer. The fluid fitting assembly may further comprise alignment features. The fluid fitting may comprise a tube and a fluid fitting flange. The fluid fitting retainer may comprise a retainer flange, wherein an inner surface of fluid fitting retainer is configured to seat against a radially outer surface of the fluid fitting flange. An alignment feature may be disposed on an outer diameter of the fluid fitting, wherein the alignment feature is located adjacent to the fluid fitting flange. The outer diameter (OD) surface of the alignment feature (also referred to herein as alignment surface) may aide in the concentric alignment of the fluid fitting and the fluid fitting retainer. The retainer flange may comprise a first flange and a second flange to aid in alignment. The inner diameter (ID) of the first flange may be greater than the ID of the second flange. The second flange may be configured to minimize the gap between an ID of the retainer flange and an OD of the fluid fitting. Minimizing this gap may minimize opportunity of misalignment during installation.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 4A illustrates a bottom view of a misaligned fluid fitting assembly installation in accordance with various embodiments;

FIG. 4B illustrates a cross-section view of a misaligned fluid fitting assembly installation in accordance with various embodiments;

FIG. 4C illustrates a cross section view of a misaligned fluid fitting assembly installation in accordance with various embodiments;

FIG. 5A illustrates a bottom view of a self-aligning fluid fitting assembly in accordance with various embodiments;

FIG. 5B illustrates a side view of a self-aligning fluid fitting assembly in accordance with various embodiments;

FIG. 5C illustrates a cross-section view of a self-aligning fluid fitting assembly in accordance with various embodiments;

FIG. 6A illustrates a bottom view of a self-aligning fluid fitting assembly in accordance with various embodiments;

FIG. 6B illustrates a cross-section view of a self-aligning fluid fitting assembly during installation in accordance with various embodiments;

FIG. 6C illustrates a cross-section view of a self-aligning fluid fitting assembly during installation in accordance with various embodiments;

FIG. 6D illustrates a cross-section view of a self-aligning fluid fitting assembly during installation in accordance with various embodiments;

FIG. 6E illustrates a cross-section view of a self-aligning fluid fitting assembly in an installed position in accordance with various embodiments;

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
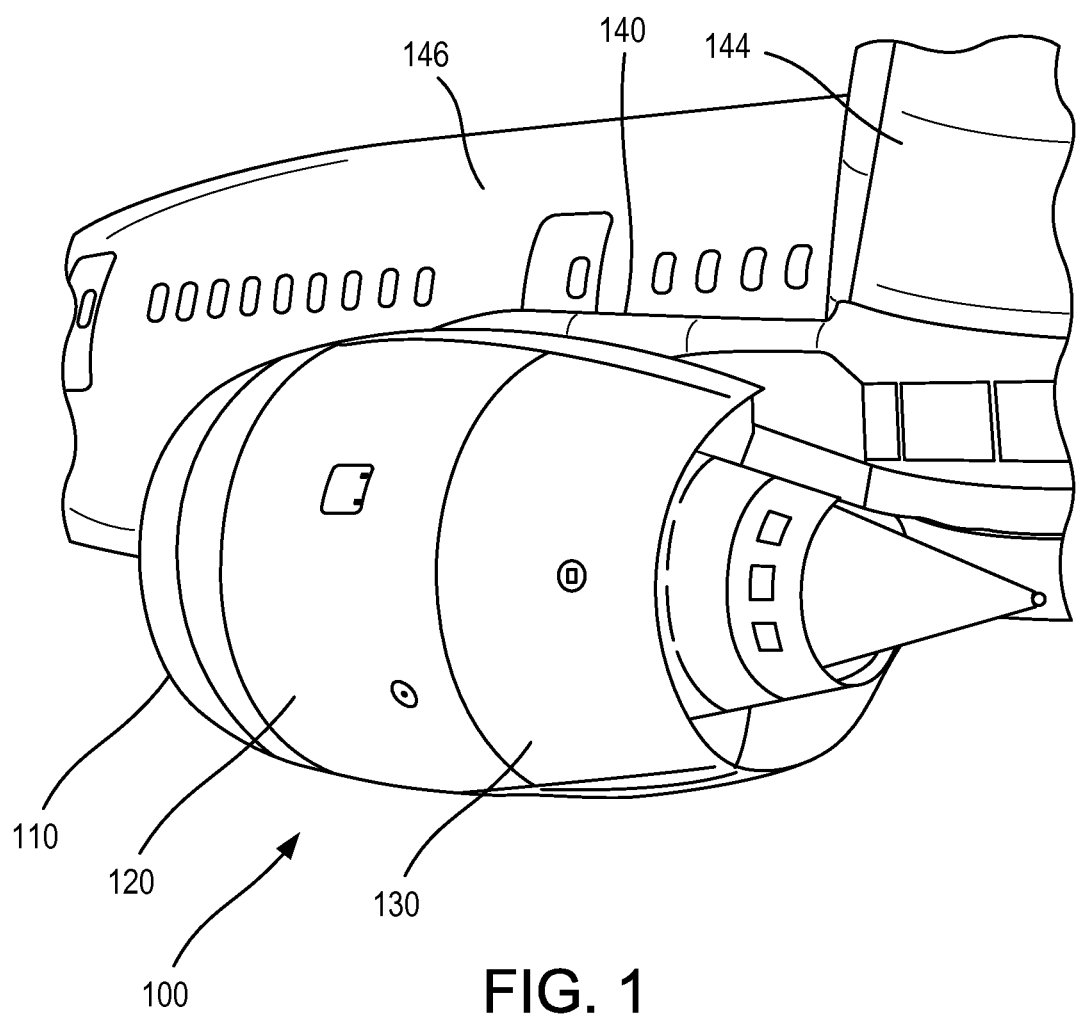
FIG. 1 illustrates a perspective view of a nacelle mounted to an aircraft wing in accordance with various embodiments.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing 144. As an example, nacelle 100 is coupled to aircraft wing 144 via pylon 140 in FIG. 1. Fuel may be stored in at least one of aircraft wing 144 and aircraft body 146. Fuel may be routed from aircraft wing 144 and/or aircraft body 146, through nacelle 140 and into a gas turbine engine located within nacelle 100.

Figure 2:
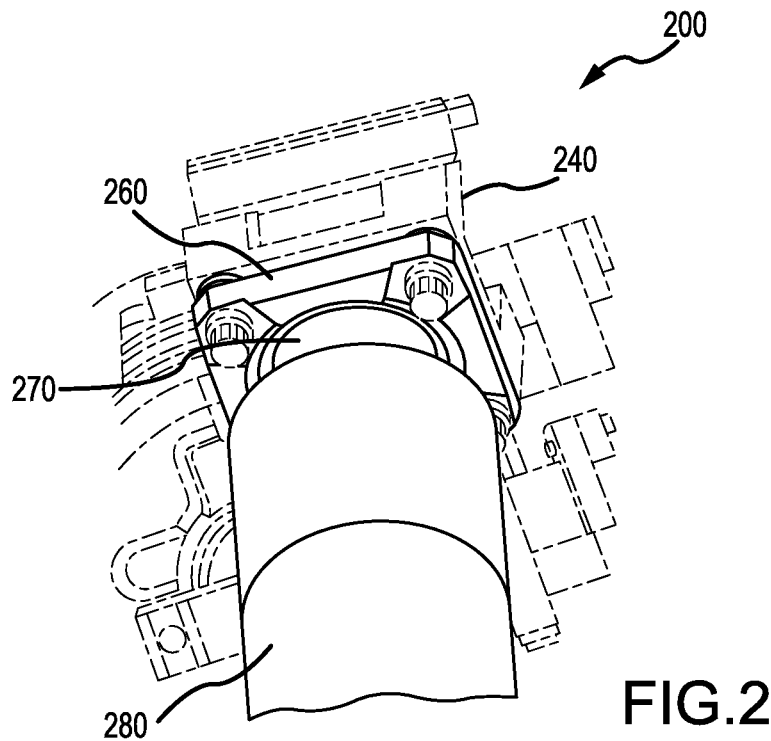
FIG. 2 illustrates a perspective view of a nacelle fuel line attachment assembly comprising self-aligning fluid fitting assemblies in accordance with various embodiments.

Referring to FIG. 2, a perspective view of a nacelle fuel line attachment assembly in accordance with various embodiments is provided. Nacelle fuel line attachment assembly 200 may include a hose 280, a fluid fitting 270, and a fluid fitting retainer 260 in accordance with various embodiments. Fluid fitting retainer 260 may be bolted to a portion of pylon 240. Fluid fitting 270 and fluid fitting retainer 260 may be configured to couple hose 280 to a portion of pylon 240. Fluid fitting 270 and hose 280 may be configured to direct the flow of fuel.

Figure 3:
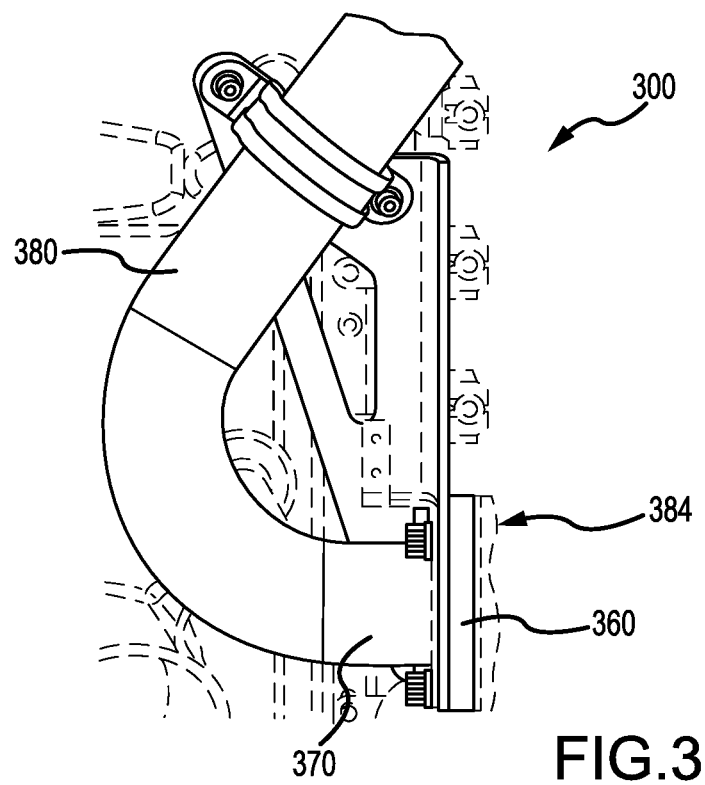
FIG. 3 illustrates a perspective view of a fuel pump fuel line attachment assembly comprising self-aligning fluid fitting assemblies in accordance with various embodiments.

Referring to FIG. 3, a perspective view of a fuel pump fuel line attachment assembly in accordance with various embodiments is provided. Fuel pump fuel line attachment assembly 300 may include a hose 380, a fluid fitting 370, and a fluid fitting retainer 360 in accordance with various embodiments. Fluid fitting retainer 360 may be bolted to a portion of fuel pump 384. Fluid fitting 370 and fluid fitting retainer 360 may be configured to couple hose 380 to a fuel pump 384. Fluid fitting 370 and hose 380 may be configured to direct the flow of fuel.

Referring to FIG. 4A through FIG. 4C, a misaligned fluid fitting installation is illustrated in accordance with various embodiments. FIG. 4A illustrates a bottom view of fluid fitting assembly 400. Fluid fitting assembly 400 may include fluid fitting 470 and fluid fitting retainer 460. Cross-section A-A' is indicated on fluid fitting assembly 400 in FIG. 4A.

FIGS. 4B and 4C are cross-section views taken along line A-A' in FIG. 4A illustrating a misaligned fluid fitting during an installation process. Fluid fitting 470 may comprise a center-line axis F-F. Fluid fitting retainer 460 may comprise a center-line axis R-R. In various embodiments, center-line axis F-F may be misaligned with center-line axis R-R during installation. A gap 492 may exist between the outer diameter (OD) of fluid fitting 470 and the inner diameter (ID) of fluid fitting retainer 460. Gap 492 will be even or uneven around the circumference of the fluid fitting 470 according to the alignment of fluid fitting 470 and fluid fitting retainer 460. The magnitude of misalignment of center-line axis F-F and center-line axis R-R may be complimentary to the size of gap 492.

FIG. 4C illustrates a misaligned fluid fitting in an installed and tightened position. Fluid fitting 470 and/or fluid fitting retainer 460 may experience deformation when installed in a misaligned position. This deformation may include elastic and/or plastic deformation. Deformation may cause fluid leaks and/or damaged parts. For example, during installation fluid fitting retainer 460 may be tightened to a portion of a gas turbine engine via a bolt or fastener. If fluid fitting 470 and/or fluid fitting retainer 460 are misaligned, a portion of fluid fitting retainer 460 may experience deformation as a bolt or fastener is tightened. This may create a gap through which fluid may leak. Furthermore, if a technician uninstalls a part which was previously installed and tightened in a misaligned fashion and then reinstalls it in a properly aligned fashion, deformations in the part may create gaps for fluid to leak, despite the proper installation. Such gaps may not be sufficiently large enough for a fluid to leak, though during operation thermal expansion and/or contraction may occur. Thus, a plastically deformed part that is subsequently installed properly may be considered to have a latent leak. It may be difficult to detect misalignment during installation. It may be difficult to detect deformed parts. A misaligned fluid fitting assembly in a tight space may appear satisfactory to a maintenance technician.

Accordingly, it may be desirable to have a fluid fitting assembly that is self-aligning. Referring to FIG. 5A through FIG. 5C, a self-aligning fluid fitting assembly is illustrated in accordance with various embodiments. X-y-z axes are shown for ease of illustration. FIG. 5A illustrates a bottom-view of self-aligning fluid fitting assembly 500 in accordance with various embodiments. A seal 555 may be located adjacent to (in the negative x-direction) and in concentric alignment (concentrically aligned about the x-axis) with fluid fitting retainer 560. Seal 555 may be configured to prevent fluid from leaking from within self-aligning fluid fitting assembly 500. Cross-section A-A' is indicated on self-aligning fluid fitting assembly 500 in FIG. 5A. In various embodiments, bolt holes 569 may be disposed on fluid fitting retainer 560. Bolt holes 569 may be configured to allow a fastener to be inserted into bolt holes 569 in order to fasten fluid fitting retainer 560 in an installed position.

In various embodiments, fluid fitting retainer 560 may comprise a square geometry as is shown in FIG. 5A. In various embodiments, fluid fitting retainer 560 may comprise a pentagonal, hexagonal, octagonal, triangular, elliptical, circular, or any other geometry.

A side view of self-aligning fluid fitting assembly 500 is illustrated In FIG. 5B. Fluid fitting 570 may comprise a tube 571. Fluid fitting 570 may be located radially inward of fluid fitting retainer 560.

FIG. 5B is a cross-section view taken along line A-A' in FIG. 5A in accordance with various embodiments. A hose attachment feature 572 may be disposed on the outer diameter (OD) surface of fluid fitting 570. Hose attachment feature 572 may comprise an annulus. Hose attachment feature 572 may be integral to fluid fitting 570. Hose attachment feature 572 may be configured to aid in the attaching of a hose to fluid fitting 570. Fluid fitting 570 may comprise a fluid fitting flange 578. Fluid fitting retainer 560 may comprise a retainer flange 562. Retainer flange 562 may be configured to extend radially inwards towards a center-line of fluid fitting retainer 560. Retainer flange 562 may be configured to engage fluid fitting flange 578 when in an installed position. Fluid fitting retainer 560 may comprise seating surface 568. Seating surface 568 may be an inner surface of fluid fitting retainer 560. The radially outer surface 577 of fluid fitting flange 578 may be configured to seat against seating surface 568 when in the installed position. Therefore, the radially outer surface 577 of fluid fitting flange 578 may comprise a diameter approximately equal to the diameter of seating surface 568.

In various embodiments, fluid fitting 570 may comprise an alignment feature 575. Alignment feature 575 may be disposed on the OD surface of fluid fitting 570. In various embodiments, alignment feature 575 may extend between fluid fitting flange 578 and a location between fluid fitting flange 578 and hose attachment feature 572. Alignment feature 575 may be located adjacent to fluid fitting flange 578. Alignment feature 575 may comprise a first portion 574 and a second portion 576. First portion 574 may be located adjacent to fluid fitting flange 578 (in the positive x-direction). In various embodiments, first portion 574 may comprise an annular ring. In various embodiments, first portion 574 may comprise an OD surface parallel with the OD surface of fluid fitting 570. The OD surface of first portion 574 may comprise a diameter approximately equal to sum of the diameter of the OD surface of fluid fitting 570 and half of the difference between the diameter of the radially outer surface 577 of fluid fitting flange 578 and the diameter of the OD surface of fluid fitting 570. Second portion 576 may be located adjacent to (in the positive x-direction) first portion 574. In various embodiments, second portion 576 may comprise a rounded annular ring. In various embodiments, second portion 576 may comprise a tapered annular ring. In various embodiments, second portion 576 may comprise an OD surface comprising a maximum diameter at the junction between first portion 574 and second portion 576, and a tapered portion (or rounded portion) extending in the positive x-direction towards hose attachment feature 572. Accordingly, alignment feature 575 may comprise a rounded annular ring, wherein a first portion 574 may comprise an OD surface parallel with the OD surface of fluid fitting 570 and a second portion 576 may comprise a tapered (or rounded) OD surface. In various embodiments, alignment feature 575 may be integral to fluid fitting 570. Alignment feature 575 may aide in the aligning of fluid fitting 570 with fluid fitting retainer 560. The OD surface of alignment feature 575 may be referred to as an alignment surface. At least a portion of seal 555 may seat adjacent to (in the negative x-direction) fluid fitting flange 578 when in the installed position.

In various embodiments, retainer flange 562 may comprise a first flange 564 and a second flange 563. First flange 564 may be located adjacent to second flange 563. In various embodiments, the inner diameter (ID) of first flange 564 may be greater than the ID of second flange 563. In various embodiments, first flange 564 may be disposed on the ID surface of retainer flange 562. In various embodiments, first flange 564 may be configured to form a gap between the ID surface of first flange 564 and the OD surface of alignment feature 575 when in the installed position. In various embodiments, first flange 564 may be configured to form a gap between the ID surface of first flange 564 and the OD surface of fluid fitting 570 when in the installed position. In various embodiments, fluid fitting 570 may comprise a fillet 579. Fillet 579 may be located at the junction between fluid fitting flange 578 and alignment feature 575. In various embodiments, first flange 564 may be configured to allow sufficient clearance between retainer flange 562 and fillet 579 when in the installed position.

In various embodiments, second flange 563 may be disposed on the ID surface of retainer flange 562. In various embodiments, the diameter of the ID surface of second flange 563 may be greater than the diameter of the OD surface of first portion 574. In various embodiments, second flange 563 may be configured to minimize the gap between the ID surface of second flange 563 and OD surface of fluid fitting 570. In various embodiments, second flange 563 may be configured to minimize the gap between the ID surface of second flange 563 and OD surface of alignment feature 575. In various embodiments, second flange 563 may be configured to comprise a minimal ID surface area. Accordingly, second flange 563 may be configured to provide minimal frictional resistance when installing fluid fitting assembly 502. In various embodiments, second flange 563 may aide in the aligning of fluid fitting 570 and fluid fitting retainer 560. In various embodiments, first flange 564 may aide in the aligning of fluid fitting 570 and fluid fitting retainer 560.

Furthermore, first flange 564 and second flange 563 may allow fluid fitting 570 to enter the aligning process in steps as opposed to one abrupt alignment. Stepped alignment may help mitigate the probability of misalignment and/or deformation.

In various embodiments, retainer flange 562 may comprise chamfered portion 566. Chamfered portion 566 may interact with fluid fitting flange 578 during installation. Chamfered portion 566 may be configured to provide minimal friction between retainer flange 562 and fluid fitting flange 578 during installation. Chamfered portion 566 may be substituted in various embodiments for a rounded edge. Chamfered (or rounded) portion 566 may be configured to aide in the self-alignment process during installation.

In various embodiments, second portion 576 may comprise an OD surface configured to be at an angle (forming a conical surface) with respect to a centerline axis (i.e., the x-axis according to FIG. 5C) of fluid fitting 570. In various embodiments, second portion 576 may comprise an OD surface configured to be at an angle of approximately forty-five (45) degrees with respect to a centerline axis (i.e., the x-axis according to FIG. 5C) of fluid fitting 570.

In various embodiments, fluid fitting retainer 560 and fluid fitting 570 may comprise stainless steel. In various embodiments, fluid fitting retainer 560 may comprise a martensitic precipitation-hardening stainless steel. In various embodiments, fluid fitting retainer 560 may comprise a martensitic precipitation-hardening stainless steel available under the trademark 15-5 PH from AK Steel Corporation, for example. In various embodiments, fluid fitting retainer 560 may comprise a martensitic precipitation-hardening stainless steel available under the trademark 15-5 PH, Condition H 1025 from AK Steel Corporation, for example. In various embodiments, fluid fitting retainer 560 may comprise yield strength of approximately 128,000 pounds per square inch (PSI) (882,528 kPa) at three hundred and eighty (380) degrees Fahrenheit (193° C.). In various embodiments, fluid fitting 570 may comprise a stabilized austenitic stainless steel such as the specified in AMS 5510 and/or ASTM A240 and commercially known as 321 stainless steel, for example.

With reference to FIG. 6A through FIG. 6E, various steps in the installation process of a self-aligning fluid fitting assembly 600 are illustrated, in accordance with various embodiments. FIGS. 6B-6E are cross-section views taken along line A-A' in FIG. 6A. X-y-z axes are shown for ease of illustration. Fluid fitting assembly 600 may be similar to fluid fitting assembly 500. In various embodiments, during installation, fluid fitting retainer 660 may translate axially (in the negative x-direction) around fluid fitting 670, as illustrated by self-aligning fluid fitting assembly 600 in FIG. 6B. Fluid fitting retainer 660 may be configured to comprise an ID of sufficient size to allow hose attachment feature 672 to pass through the ID surface of fluid fitting retainer 660 during installation. Accordingly, the minimum ID of fluid fitting retainer 660 may be greater than the OD of hose attachment feature 672. In various embodiments, fluid fitting center-line F-F and fluid fitting retainer center-line R-R may become closely aligned as fluid fitting retainer 660 passes over hose attachment feature 672. In various embodiments, as fluid fitting retainer 660 translates further in the negative x-direction, as shown in FIG. 6C, fluid fitting center-line F-F may become misaligned with fluid fitting retainer center-line R-R. Accordingly, retainer flange 662 may interact with the OD surface of fluid fitting 670.

In various embodiments, as shown in FIG. 6D, the alignment process may start when retainer flange 662 interacts with the OD surface of alignment feature 675. In various embodiments, alignment feature 675 may be similar to alignment feature 575. In various embodiments, the OD surface of alignment feature 675 may be configured to interact with retainer flange 662, causing fluid fitting center-line F-F and fluid fitting retainer center-line R-R to begin aligning. In various embodiments, after the alignment begins, chamfer portion 666 of fluid fitting retainer 660 may interact with fluid fitting flange 678 as a continuation of the alignment process. In various embodiments, the interaction may cause fluid fitting center-line F-F and fluid fitting retainer center-line R-R to continue aligning.

In various embodiments, as shown in FIG. 6E, the alignment process ends in the installed position where fluid fitting flange 678 is positively engaged with retainer flange 662. In various embodiments, the bottom surface of fluid fitting flange 678 and the bottom surface of fluid fitting retainer 660 may be parallel to one another in the installed position. Fluid fitting center-line F-F and fluid fitting retainer center-line R-R may be aligned when in the installed position.

With respect to FIGS. 7-10 elements with identical element numbering as depicted in FIGS. 5A-5C are intended to be the same and will not be repeated for the sake of clarity. With respect to FIGS. 7-10 elements may comprise identical materials as described for elements according to FIGS. 5A-5C.

Figure 7:
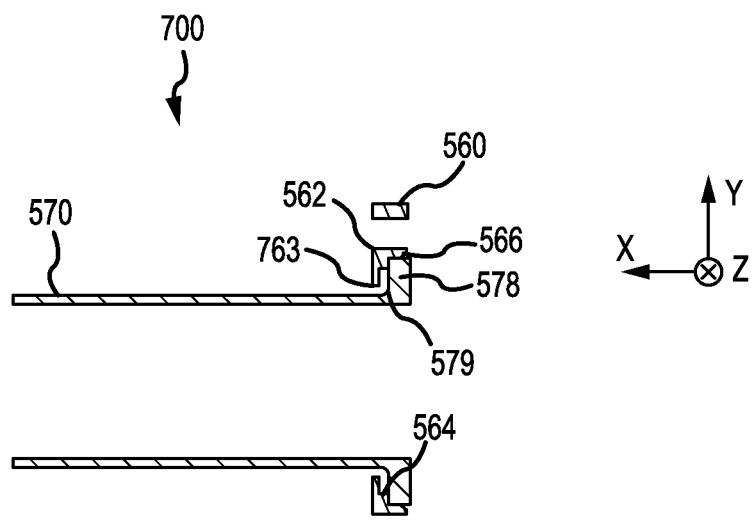
FIG. 7 illustrates a cross-section view of a self-aligning fluid fitting assembly in accordance with various embodiments.

Referring to FIG. 7, a self-aligning fluid fitting assembly is illustrated in accordance with various embodiments. X-y-z axes are shown for ease of illustration. Fluid fitting assembly 700 may include fluid fitting 570 and fluid fitting retainer 560. In various embodiments, second flange 763 may be disposed on the ID surface of retainer flange 562. Second flange 763 may be similar in function to second flange 563 as described in FIG. 5C. In various embodiments, without any features disposed on the OD surface of fluid fitting 570, the gap between the OD surface of fluid fitting 570 and the ID surface of second flange 763 may be minimized by extending second flange 763 radially inward. Accordingly, probability of misalignment of fluid fitting 570 and fluid fitting retainer 560 is minimized. The ID of second flange 763 may be greater than the OD of fluid fitting 570. The ID of first flange 564 may be greater than the ID of second flange 763.

Figure 8:
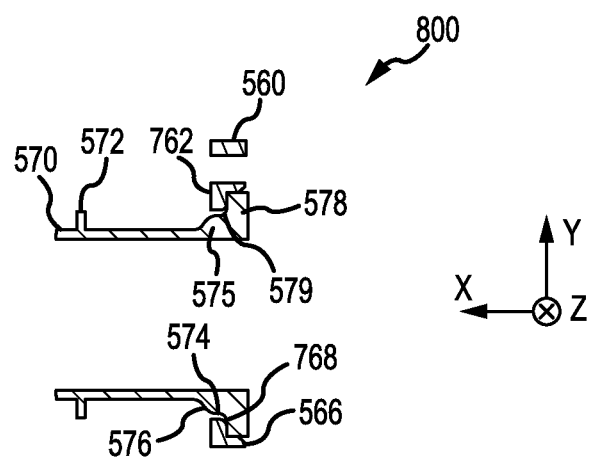
FIG. 8 illustrates a cross-section view of a self-aligning fluid fitting assembly in accordance with various embodiments.

Referring to FIG. 8, a self-aligning fluid fitting assembly is illustrated in accordance with various embodiments. X-y-z axes are shown for ease of illustration. In various embodiments, fluid fitting retainer may comprise retainer flange 762. Retainer flange 762 may be similar in function to retainer flange 562 of FIG. 5C. In various embodiments, when in the installed position, retainer flange 762 may extend radially inward towards a centerline axis of fluid fitting 570. In various embodiments, the ID of retainer flange 762 may be greater than the OD of alignment feature 575. Retainer flange 762 may be configured to engage fluid fitting flange 578 when in an installed position. Retainer flange 762 may be configured to minimize the gap between the OD surface of alignment feature 575 and the ID surface of retainer flange 762. A minimal gap size may aide in the aligning of fluid fitting 570 and fluid fitting retainer 560. Retainer flange 762 may comprise a rounded portion 768. Rounded portion 768 may comprise a fillet. Rounded portion 768 may aide in the aligning of fluid fitting 570 and fluid fitting retainer 560. Rounded portion 768 may provide a smooth surface to interact with alignment feature 575. In various embodiments, the diameter of the ID surface of retainer flange 762 may be greater than the diameter of the OD surface of first portion 574. Rounded portion 768 may be configured to mitigate friction forces between alignment feature 575 and retainer flange 762 during installation. Rounded portion 768 may be substituted in various embodiments for a chamfered edge. Rounded (or chamfered) portion 768 may be configured to mitigate pressure between alignment feature 575 and retainer flange 762 during installation.

Figure 9:
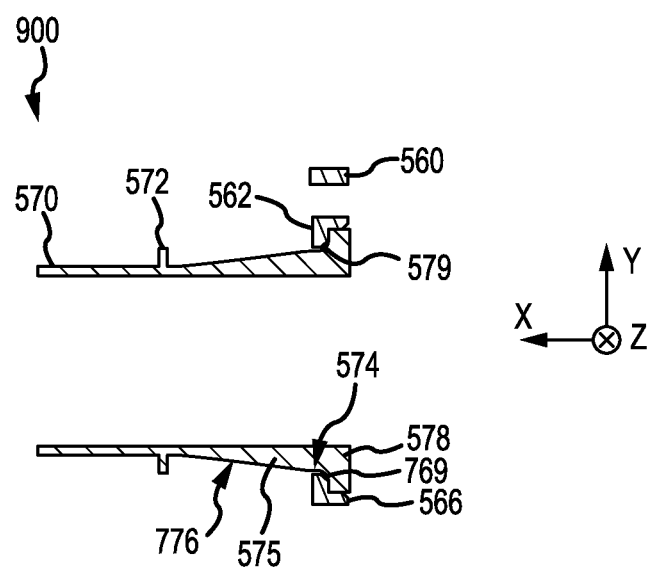
FIG. 9 illustrates a cross-section view of a self-aligning fluid fitting assembly in accordance with various embodiments.
Figure 10:
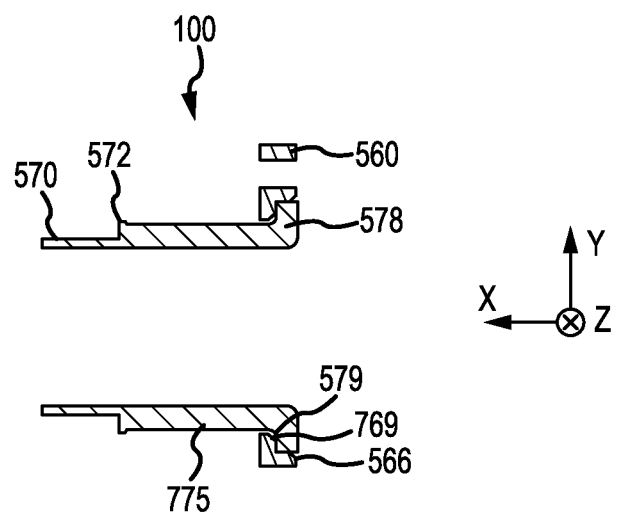
FIG. 10 illustrates a cross-section view of a self-aligning fluid fitting assembly in accordance with various embodiments.

With respect to FIGS. 9-10 elements with identical element numbering as depicted in FIG. 8 are intended to be the same and will not be repeated for the sake of clarity.

Referring to FIG. 9, a self-aligning fluid fitting assembly is illustrated in accordance with various embodiments. X-y-z axes are shown for ease of illustration. In various embodiments, alignment feature 575 may comprise a second portion 776. Second portion 776 may be located adjacent to (in the positive x-direction) first portion 574. Second portion 776 may comprise a rounded annular ring. In various embodiments, second portion 776 may comprise an OD surface comprising a maximum diameter at the junction between first portion 574 and second portion 776 and a tapered portion extending in the positive x-direction towards hose attachment feature 572, forming a conical surface. In various embodiments, the tapered portion of second portion 776 may extend from first portion 674 towards the hose attachment feature 572, in the positive x-direction, to a location in close proximity to hose attachment feature 572. The function of second portion 776 may be similar to the function of second portion 576 of FIG. 5C. Second portion 576 may be configured to cause a gradual alignment of fluid fitting 570 and fluid fitting retainer 560 during installation. A gradual alignment may prevent parts from catching on other parts and deforming during installation. In a preferred embodiment, retainer flange 762 may comprise chamfered portion 769. Chamfered portion 769 may comprise a chamfered edge. Chamfered portion 769 may be similar in function to rounded portion 768 of FIG. 8. Chamfered portion 769 may be substituted in various embodiments for a rounded portion.

Referring to FIG. 10, a self-aligning fluid fitting assembly is illustrated in accordance with various embodiments. X-y-z axes are shown for ease of illustration. In various embodiments, fluid fitting 570 may comprise alignment feature 775. Alignment feature 775 may be disposed on the OD surface of fluid fitting 570. In various embodiments, alignment feature 775 may extend between fluid fitting flange 578 and hose attachment feature 572. Alignment feature 775 may comprise an annular ring. In various embodiments, alignment feature 775 may comprise an OD surface parallel with the OD surface of fluid fitting 570, forming a cylindrical surface. In various embodiments, alignment feature 775 may be integral to fluid fitting 570. Alignment feature 775 may aide in the aligning of fluid fitting 570 with fluid fitting retainer 560. Alignment feature 775 may be similar in function to alignment feature 575 of FIG. 5C. In various embodiments, during installation, a technician may axially translate fluid fitting retainer 560 over hose attachment feature 572 (in the negative x-direction). As fluid fitting retainer 560 axially translates over hose attachment feature 572, fluid fitting retainer 560 and fluid fitting 570 may become closely aligned. In this regard, alignment feature 775 may be configured to maintain alignment of fluid fitting 570 and fluid fitting retainer 560 as fluid fitting retainer 560 continues to axially translate over fluid fitting 570 (in the negative x-direction) until fluid fitting retainer 560 is in an installed position.

While the self-aligning fluid fitting assemblies described herein have been described in the context of aircraft applications, one will appreciate in light of the present disclosure that the system described herein may be used in connection with various other vehicles, for example, a launch vehicle, a spacecraft, an unmanned aerial vehicle, a missile, cars, trucks, busses, trains, boats, and submersible vehicles, or any other vehicle or device, or in connection with industrial processes, or propulsion systems, or any other system or process having fluid fittings.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fluid fitting assembly comprising: a fluid fitting defining a centerline axis, wherein the fluid fitting comprises a tube and a fluid fitting flange, the tube and the fluid fitting flange form a monolithic structure, the fluid fitting flange having an outermost end axially opposite the tube; a monolithic fluid fitting retainer comprising an inner surface defining a seating surface and a retainer flange axially adjacent the seating surface, the retainer flange extending inward from the seating surface, the seating surface is configured to seat against a radially outer surface of the fluid fitting flange, the fluid fitting retainer having an outermost end axially opposite the retainer flange; and an alignment feature disposed on an outer diameter, hereinafter OD, surface of the fluid fitting, wherein the alignment feature is located adjacent to the fluid fitting flange, the alignment feature is radially aligned with the retainer flange and is radially spaced apart from the retainer flange forming a circumferential gap in response to the monolithic fluid fitting retainer being in an installed position, and the retainer flange comprises a first flange extending inward from the seating surface and a second flange extending inward from the first flange, wherein in a final installed position the outermost end of the fluid fitting flange extends axially beyond the outermost end of the fluid fitting retainer in an axial direction opposite the tube, and the fluid fitting retainer abuts the fluid fitting flange both radially and longitudinally about an entire circumference thereof.

2. The fluid fitting assembly of claim 1, wherein a hose attachment feature is disposed on the OD surface of the fluid fitting, wherein an OD of the hose attachment feature is equal to an OD of the alignment feature.

3. The fluid fitting assembly of claim 2, wherein the alignment feature comprises a first portion, wherein the first portion comprises an annular ring, wherein an OD surface of the annular ring is parallel to the OD surface of the fluid fitting, forming a cylindrical surface.

4. The fluid fitting assembly of claim 3, wherein the alignment feature comprises a second portion, wherein the second portion comprises a tapered annular ring, wherein an OD surface of the tapered annular ring is tapered from an OD surface of the first portion to an OD surface of the fluid fitting, forming a conical surface.

5. The fluid fitting assembly of claim 4, wherein the second portion extends between the first portion and a location between the first portion and the hose attachment feature.

6. The fluid fitting assembly of claim 4, wherein an OD surface of the second portion comprises an angle of 45 degrees with respect to a centerline axis of the fluid fitting.

7. The fluid fitting assembly of claim 3, wherein an inner diameter, hereinafter ID, of the first flange is greater than an ID of the second flange, wherein an ID of the second flange is greater than an OD of the first portion.

8. The fluid fitting assembly of claim 7, wherein an ID of the seating surface is greater than the ID of the first flange.

9. The fluid fitting assembly of claim 7, wherein the first flange is radially aligned with the alignment feature.

10. The fluid fitting assembly of claim 3, wherein the retainer flange comprises at least one of a chamfered and rounded portion configured to aid in aligning the fluid fitting concentrically with the retainer flange, wherein an ID of the retainer flange is greater than an OD of the first portion.

11. The fluid fitting assembly of claim 1, wherein the retainer flange comprises at least one of a chamfered and rounded portion configured to aid in aligning the fluid fitting concentrically with the retainer flange.

12. The fluid fitting assembly of claim 1, wherein the monolithic fluid fitting retainer comprises a martensitic precipitation-hardening stainless steel.

13. The fluid fitting assembly of claim 1, wherein the tube and the fluid fitting flange are comprised of a single piece of material.

14. The fluid fitting assembly of claim 13, wherein the retainer flange is configured to engage the fluid fitting flange to retain the tube with the monolithic fluid fitting retainer.

15. A fluid fitting assembly comprising: a fluid fitting comprising a tube and a fluid fitting flange, the tube and the fluid fitting flange form a monolithic structure, the fluid fitting flange having an outermost end axially opposite the tube; an alignment feature disposed on an outer diameter, hereinafter OD, surface of the fluid fitting, wherein a diameter of the OD surface of the fluid fitting is less than a diameter of an OD surface of the alignment feature; and a monolithic fluid fitting retainer comprising an inner surface defining a seating surface and a retainer flange axially adjacent the seating surface, the retainer flange extending inward from the seating surface, the seating surface is configured to seat against a radially outer surface of the fluid fitting flange, the fluid fitting retainer having an outermost end axially opposite the retainer flange, wherein the retainer flange comprises a first flange extending inward from the seating surface and a second flange extending inward from the first flange, wherein a minimum inner diameter, hereinafter ID, of the retainer flange is greater than a maximum OD of the alignment feature, thereby forming a circumferential gap, wherein the retainer flange is configured to aide in concentrically aligning the fluid fitting and the retainer flange, wherein in a final installed position the outermost end of the fluid fitting flange extends axially beyond the outermost end of the fluid fitting retainer in an axial direction opposite the tube, and the fluid fitting retainer abuts the fluid fitting flange both radially and longitudinally about an entire circumference thereof.

16. The fluid fitting assembly of claim 15, wherein an ID of the first flange is greater than an ID of the second flange.

17. The fluid fitting assembly of claim 15, wherein the retainer flange comprises at least one of a chamfered and rounded portion configured to aid in aligning the fluid fitting concentrically with the retainer flange.

18. The fluid fitting assembly of claim 15, further comprising a hose attachment feature, wherein the hose attachment feature is disposed on the OD surface of the fluid fitting.

19. The fluid fitting assembly of claim 18, wherein the alignment feature is an annular ring extending between the fluid fitting flange and the hose attachment feature, wherein the OD surface of the alignment feature and the OD surface of the fluid fitting are parallel.

20. The fluid fitting assembly of claim 15, wherein the tube and the fluid fitting flange are comprised of a single piece of material.

* * * * *